(12) United States Patent
Sarakas (10) Patent No.: US 10,303,783 B2
(45) Date of Patent: *May 28, 2019

(54) DISTRIBUTED VIRTUAL STORAGE OF PORTABLE MEDIA FILES

(75) Inventor: Stephen T. Sarakas, St. Peters, MO (US)

(73) Assignee: Callplex, Inc., St. Peters, MO (US)

( * ) Notice: Subject to any disclaimer, the term of this patent is extended or adjusted under 35 U.S.C. 154(b) by 840 days.

This patent is subject to a terminal disclaimer.

(21) Appl. No.: 12/577,404

(22) Filed: Oct. 12, 2009

(65) Prior Publication Data

US 2010/0030827 A1 Feb. 4, 2010

Related U.S. Application Data

(63) Continuation-in-part of application No. 11/675,367, filed on Feb. 15, 2007, now Pat. No. 8,996,586.

(60) Provisional application No. 60/773,903, filed on Feb. 16, 2006.

(51) Int. Cl.
*G06F 7/00* (2006.01)
*G06F 17/30* (2006.01)
*G06F 9/30* (2018.01)

(52) U.S. Cl.
CPC .... *G06F 17/30233* (2013.01); *G06F 9/30018* (2013.01)

(58) Field of Classification Search
CPC .................................................. G06F 9/30018
USPC ........................... 707/999.001, 999.104, 754
See application file for complete search history.

(56) References Cited

U.S. PATENT DOCUMENTS

| | | |
|---|---|---|
| 5,014,197 A | 5/1991 | Wolf |
| 5,191,611 A | 3/1993 | Lang |
| 5,485,474 A | 1/1996 | Rabin |
| 5,544,320 A | 8/1996 | Konrad |
| 5,625,692 A | 4/1997 | Herzberg et al. |
| 5,647,000 A | 7/1997 | Leighton |
| 5,696,901 A | 12/1997 | Konrad |
| 5,708,714 A | 1/1998 | Lopez et al. |

(Continued)

FOREIGN PATENT DOCUMENTS

| | | |
|---|---|---|
| JP | 2000194600 A | 7/2000 |
| JP | 2003186726 A | 7/2003 |
| JP | 2005025419 A | 1/2005 |

OTHER PUBLICATIONS

US 7,155,513 B2, 12/2006, Arakawa et al. (withdrawn)

(Continued)

*Primary Examiner* — Eliyah S Harper
(74) *Attorney, Agent, or Firm* — Stinson Leonard Street LLP (57) ABSTRACT

Storing a file on a virtual file system associated with a portable media drive. The virtual file system includes the portable media drive and allocated storage of a plurality of storage servers. The file is partitioned into a local portion and at least one remote portion. The local portion is stored on the portable media drive and the remote portions are transferred to a process server. The process server treats each portion as an independent file and stores it to an appropriate storage server without reference to the original file, to other portions, or to the user. For a virtually compressed file, the storage size of the file on the virtual file system is calculated as a function of the storage size of the local portion on the portable media drive.

17 Claims, 9 Drawing Sheets

(56) References Cited

U.S. PATENT DOCUMENTS

| | | | |
|---|---|---|---|
| 5,734,892 A * | 3/1998 | Chu | G11B 20/00007 |
| 5,761,667 A | 6/1998 | Koeppen | |
| 5,764,767 A | 6/1998 | Beimel et al. | |
| 5,771,354 A | 6/1998 | Crawford | |
| 5,802,357 A | 9/1998 | Li et al. | |
| 5,809,145 A | 9/1998 | Slik et al. | |
| 5,857,180 A | 1/1999 | Hallmark et al. | |
| 5,860,132 A | 1/1999 | Carter et al. | |
| 5,861,883 A | 1/1999 | Cuomo et al. | |
| 5,887,274 A | 3/1999 | Barry et al. | |
| 5,897,638 A | 4/1999 | Lasser et al. | |
| 5,901,228 A | 5/1999 | Crawford | |
| 5,940,823 A | 8/1999 | Schreiber et al. | |
| 5,956,490 A | 9/1999 | Buchholz et al. | |
| 5,987,506 A | 11/1999 | Carter et al. | |
| 5,991,414 A | 11/1999 | Garay et al. | |
| 5,999,622 A | 12/1999 | Yasukawa et al. | |
| 6,003,030 A | 12/1999 | Kenner et al. | |
| 6,014,651 A | 1/2000 | Crawford | |
| 6,035,325 A | 3/2000 | Potts, Jr. | |
| 6,088,454 A | 7/2000 | Nagashima et al. | |
| 6,128,627 A | 10/2000 | Mattis et al. | |
| 6,182,214 B1 | 1/2001 | Hardjono | |
| 6,185,655 B1 | 2/2001 | Peping | |
| 6,192,472 B1 | 2/2001 | Garay et al. | |
| 6,275,939 B1 | 8/2001 | Garrison | |
| 6,327,579 B1 | 12/2001 | Crawford | |
| 6,330,653 B1 * | 12/2001 | Murray | G06F 3/0605 |
| | | | 707/E17.01 |
| 6,351,776 B1 | 2/2002 | O'Brien et al. | |
| 6,351,810 B2 | 2/2002 | Gupta | |
| 6,356,863 B1 | 3/2002 | Sayle | |
| 6,363,417 B1 | 3/2002 | Howard et al. | |
| 6,363,481 B1 | 3/2002 | Hardjono | |
| 6,405,278 B1 | 6/2002 | Liepe | |
| 6,411,943 B1 | 6/2002 | Crawford | |
| 6,427,149 B1 * | 7/2002 | Rodriguez | G06F 17/30076 |
| | | | 707/693 |
| 6,473,860 B1 | 10/2002 | Chan | |
| 6,480,963 B1 | 11/2002 | Tachibana et al. | |
| 6,587,949 B1 | 7/2003 | Steinberg | |
| 6,687,687 B1 | 2/2004 | Smadja | |
| 6,711,594 B2 | 3/2004 | Yano et al. | |
| 6,748,084 B1 | 6/2004 | Gau et al. | |
| 6,754,696 B1 * | 6/2004 | Kamath | G06F 17/30067 |
| | | | 707/999.003 |
| 6,766,167 B2 | 7/2004 | Tung et al. | |
| 6,772,302 B1 | 8/2004 | Thompson | |
| 6,782,418 B1 | 8/2004 | Cerrone et al. | |
| 6,804,702 B2 | 10/2004 | Duroj | |
| 6,804,719 B1 | 10/2004 | Cabrera et al. | |
| 6,810,122 B1 | 10/2004 | Miyazaki et al. | |
| 6,816,941 B1 | 11/2004 | Carlson et al. | |
| 6,931,542 B1 | 8/2005 | Gregoire | |
| 6,931,549 B1 | 8/2005 | Ananda | |
| 6,976,073 B2 | 12/2005 | Desoli et al. | |
| 6,985,927 B2 | 1/2006 | O'Brien et al. | |
| 7,010,650 B2 | 3/2006 | Kawamura et al. | |
| 7,058,014 B2 | 6/2006 | Sim | |
| 7,080,051 B1 | 7/2006 | Crawford | |
| 7,111,138 B2 | 9/2006 | Higaki et al. | |
| 7,113,945 B1 | 9/2006 | Moreshet et al. | |
| 7,124,152 B2 | 10/2006 | Fish | |
| 7,136,801 B2 | 11/2006 | Leonhardt et al. | |
| 7,136,981 B2 | 11/2006 | Burch, Jr. et al. | |
| 7,139,809 B2 | 11/2006 | Husain et al. | |
| 7,165,095 B2 | 1/2007 | Sim | |
| 7,171,453 B2 | 1/2007 | Iwami | |
| 7,177,270 B2 | 2/2007 | Sim et al. | |
| 7,287,068 B1 | 10/2007 | Eriksson et al. | |
| 7,325,041 B2 | 1/2008 | Hara et al. | |
| 7,340,492 B2 | 3/2008 | Cabrera et al. | |
| 7,380,082 B2 | 5/2008 | Meiri et al. | |
| 7,415,608 B2 | 8/2008 | Bolosky et al. | |
| 7,480,761 B2 | 1/2009 | Birrell et al. | |
| 7,567,985 B1 * | 7/2009 | Comay | G06F 11/3476 |
| 7,630,986 B1 | 12/2009 | Herz et al. | |
| 2001/0001761 A1 | 5/2001 | Tung et al. | |
| 2002/0101989 A1 * | 8/2002 | Markandey | H04N 5/913 |
| | | | 380/210 |
| 2002/0138504 A1 | 9/2002 | Yano et al. | |
| 2004/0148571 A1 * | 7/2004 | Lue | 715/514 |
| 2004/0199779 A1 | 10/2004 | Huang | |
| 2005/0060316 A1 | 3/2005 | Kamath et al. | |
| 2005/0091461 A1 | 4/2005 | Kisley et al. | |
| 2005/0108263 A1 | 5/2005 | Cabrera et al. | |
| 2005/0240749 A1 * | 10/2005 | Clemo | G06F 3/062 |
| | | | 711/170 |
| 2006/0015473 A1 * | 1/2006 | Swan | G06F 17/3028 |
| 2006/0059171 A1 * | 3/2006 | Borthakur | G06F 17/30067 |
| 2006/0078127 A1 | 4/2006 | Cacayorin | |
| 2006/0206889 A1 | 9/2006 | Ganesan et al. | |
| 2007/0143277 A1 * | 6/2007 | Van De Laar | G06F 17/3002 |
| 2008/0109437 A1 | 5/2008 | Perrizo et al. | |
| 2008/0126357 A1 | 5/2008 | Casanova et al. | |
| 2008/0126705 A1 | 5/2008 | Jogand-Coulomb et al. | |
| 2008/0256147 A1 | 10/2008 | Anand et al. | |
| 2008/0301775 A1 | 12/2008 | Ollikainen et al. | |
| 2009/0019223 A1 | 1/2009 | Lection et al. | |
| 2009/0070344 A1 | 3/2009 | Espelien | |
| 2009/0132676 A1 | 5/2009 | Tu et al. | |

OTHER PUBLICATIONS

Shamir, "How to Share a Secret," Communications of the ACM, Nov. 1979, pp. 612-613, vol. 22, No. 11, U.S.A.

Rabin, "Efficient Dispersal of Information for Security, Load Balancing, and Fault Tolerance," Journal of ACM, Apr. 1989, pp. 335-348, vol. 36, No. 2, USA.

Unknown, "Java Web Start Overview," Technical White Paper, May 2005, 14 pages, Sun Microsystems, USA.

Unknown, "A 5-Step Guide to Protecting Backup Data," 2005, 17 pages, Iron Mountain, USA.

Chance, "Understanding USB Flash Drives as Portable Infrastructure," 2005, 6 pages, Browsercraft, LLC., USA.

Unknown, "Executive's Guide: Best Practices for Offsite Data Protection and Recovery," 2006, 10 pages, Iron Mountain, USA.

Unknown, "Highly Secure, Highly Reliable, Open Source Storage Solution," Technical Whitepaper, Jun. 2006, 13 pages, Cleversafe, LLC., USA.

Sun et al., "An Efficient Construction of Perfect Secret Sharing Schemes for Graph-Based Access Structures," Computers and Mathematics with Applications, vol. 31, No. 7, 1996, pp. 129-135, Elsevier Science Ltd., UK.

Processor, "Personal Portable Security Devices", Jun. 5, 2009, 3 pages, vol. 31 Issue 16, Sandhills Publishing Company, United States.

Richard Dreger, Grant Moerschel, "Smartphone Security: It's Your Call", InformationWeekAnalytics.com, Jun. 1, 2009, 18 pages.

Gil Sever, "Safeguarding removable-media devices", Network World, 1 page, Jan. 12, 2009 www.networkworld.com.

Lisa Phifer Information Security Magazine, "Diverse mobile devices changing security paradigm", Nov. 2008, 6 pages.

Alexander Wolfe, "How the smartphone is becoming a portal to enterprise apps", Information Week, Oct. 1, 2009, 12 pages, New York, New York.

"Mobile device security is a concern", Communication News, Trends, Enterprise Network Solutions, Jul. 2008, 4 pages.

Sam Wong, "Risk Associated With USB Memory Sticks and High Capacity Storage Devices", Siemens Insight Consulting, 4 pages, United Kingdom.

* cited by examiner

DISTRIBUTED VIRTUAL STORAGE OF PORTABLE MEDIA FILES

CROSS-REFERENCE TO RELATED APPLICATION

This application is a continuation-in-part of U.S. Ser. No. 11/675,367, filed Feb. 15, 2007, which is based on U.S. Ser. No. 60/773,903, filed Feb. 16, 2006, the entire contents of which are incorporated herein by reference.

FIELD OF THE INVENTION

The present invention generally relates to methods and systems of partitioning and storing files.

BACKGROUND OF THE INVENTION

Ordinarily, files are stored in their entirety, regardless of actual location. When a file is divided into parts for efficient storage or transmitted serially, the parts are nevertheless linked to each other. Consequently, all the informational contents of the file become bound to a physical location.

A chief purpose of operating systems is to manage file storage and retrieval. An added layer of abstraction is used to create a logical file system above the corresponding physical storage. A file can be made to appear to an application as a singular instance of storage, when in actuality it may have been divided into parts, each stored in separate physical locations. Logical file systems can even be created from entirely disparate storage resources, perhaps using different technologies. This added layer of abstraction is commonly referred to by using terminology invoking virtuality. However, the scope of virtuality in this regard is limited, since location independence is achieved by simply mapping the logical file system to corresponding physical locations. All the parts of a given file are immediately identifiable and directly accessible. As a result, informational contents of the file remain bound to a certain physical location.

Users seeking increased mobility have generated new demands for file accessibility without the physical location constraints described above. Whether a file represents an image, music, or an important document, the distinction between local and remote storage is diminishing. High-speed access adds further to an illusion that remotely stored files are available locally, yet the importance placed on access controls is a reminder that desired files are physically stored on a distant server. This commonly escapes mobile workers and the concept of a network perimeter has become blurred. Privacy and security concerns are now crucial, but existing technology must be applied in ever more complicated schemes to balance access and protection.

Portable media technology has steadily improved for many years. In this context, the meaning of portable with regard to file storage media is not necessarily a reference to a particular type of memory, but to any file storage media that enhances mobility—the ability to access files from any location. In the past, one highly recognized form of "portable" media is that of the floppy disk. More recently, the use of floppy disks has been overtaken by USB (Universal Serial Bus) Flash technology. Flash memory devices have also been embedded in products of all types, frequently to enhance communication means. Portable media drives that employ such flash technology make available a wide range of storage capacities, each in a compact physical form that users find immensely convenient to transfer files to and from other locations. However, a given portable media drive possesses a limited and inflexible capacity. Reaching the full capacity of the portable media drive hence compels the user to delete other files, or to acquire additional drive space.

Portable media drive storage also suffers from drawbacks generally associated with storing files in their entirety at a physically identifiable location, such as privacy and security issues, in addition to other limitations. The loss or theft of the portable media drive presents the user with a painful consequence of its compact form. And, while the portable media drive itself is generally quite reliable, files can be lost or compromised due to the failure of the portable media drive. In some cases, the files stored on the portable media drive can be replaced, but the loss or theft of the drive poses a serious threat to personal privacy and to corporate security. Furthermore, the user may not become immediately aware that files stored on the portable media drive had been lost or compromised.

As known to one of skill in the art, file compression can be used to overcome some of these issues. For example, it is possible to reduce the size of a file by identifying occurrences of statistical redundancy within the file, then replacing each with a token shorter than the data that it represents. Encipherment can be used to render a file unintelligible to all but the intended recipient. When storing files, users are themselves the intended recipients. Ciphers scramble file contents according to rules obeyed by the algorithm, using a separate variable to steer the process in a unique way for each different variable. Like compression programs, ciphers are seldom kept secret. Instead, the variables used are treated carefully to avoid compromise, necessitating separate storage. However, the statistical coding information used in file compression must be embedded in the file itself to facilitate decompression later. Notwithstanding these differences, both compression programs and ciphers are deterministic processes, and both produce files containing all of their original informational contents.

SUMMARY OF THE INVENTION

Embodiments of the invention overcome one or more disadvantages of conventional portable storage by providing a method of storing files that comprises determining a number of portions in which a file will be stored, including a terminal portion. A portion size is calculated for each portion. Each portion is modified with the results of logical operations against at least one other portion. Each modified portion, other than the terminal portion, is assigned a unique name based on the content of at least one other modified portion. The terminal portion is stored on a local storage device of the user, and all the other modified portions are stored to a remote storage.

This summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

Other objects and features will be in part apparent and in part pointed out hereinafter.

BRIEF DESCRIPTION OF THE DRAWINGS

Corresponding reference characters indicate corresponding parts throughout the drawings.

DESCRIPTION

Co-invented and co-owned U.S. Non-Provisional patent application Ser. No. 11/675,367 filed on Feb. 15, 2007 and titled "VIRTUAL STORAGE OF PORTABLE MEDIA FILES", is incorporated by reference herein.

Figure 1:
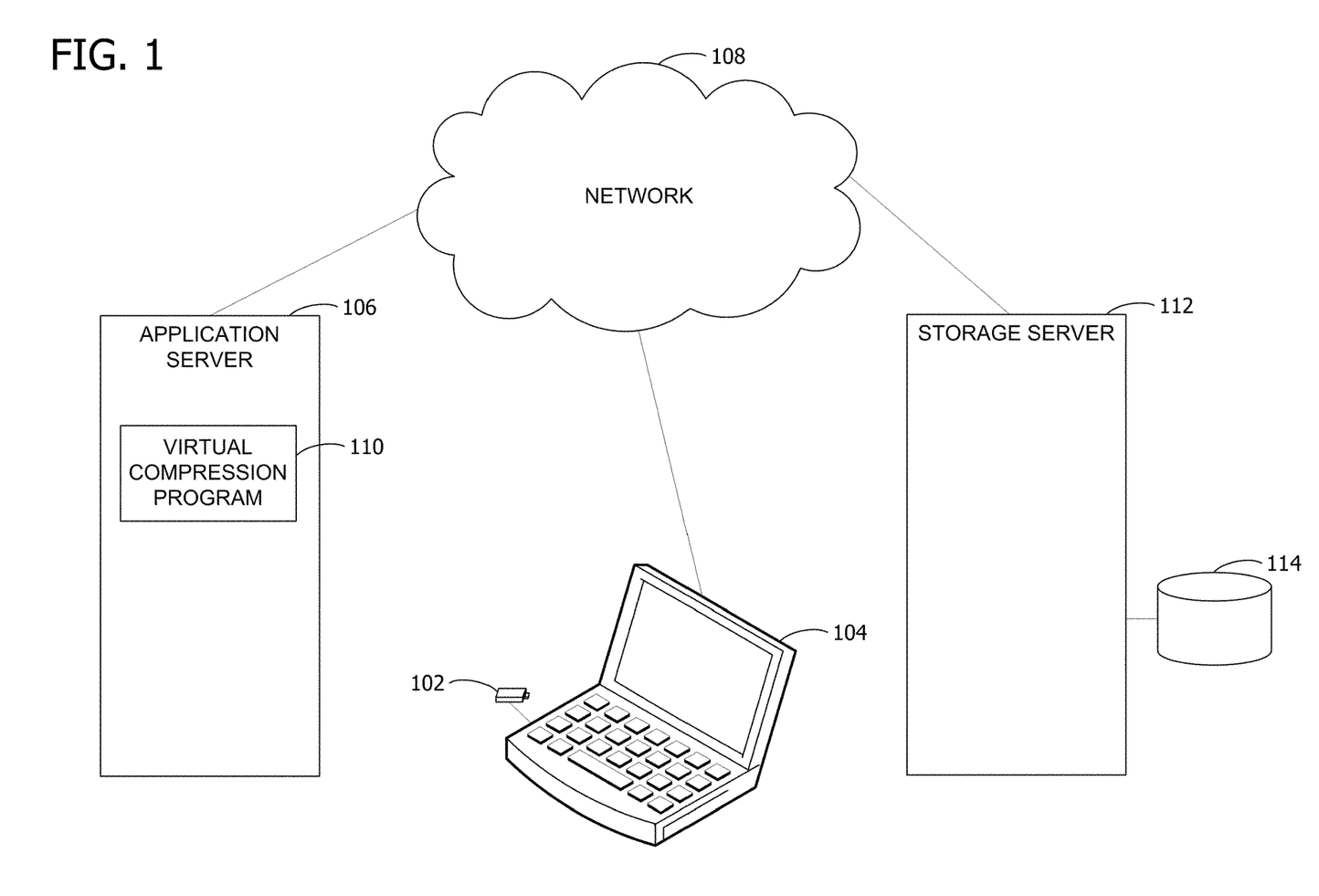
FIG. 1 is a block diagram illustrating a first example of a suitable computing system environment in which aspects of the invention may be implemented.

Referring now to the drawings, an embodiment of the invention includes a virtual file system and the virtual compression of a file. In FIG. 1, a portable media drive 102 (e.g. Universal Serial Bus (USB) drive) connects to a computer 104. The portable media drive 102 illustrated in FIG. 1 is shown as a USB drive for convenience only. The portable media drive 102 includes CompactFlash card, Memory Stick, MicroSD, MiniSD, MultiMediaCard (MMC), Pen Drives, high-speed MMC, reduced-size MMC, Secure Digital (SD), xD-Picture Card, floppy disk, read/write CD-ROM, read/write DVD-ROM and ZIP disks or any other portable media drive 102 capable of connecting to the computer 104.

FIG. 1 shows one example of a general purpose computing device in the form of a computer 104. In one embodiment of the invention, a computer such as the computer 104 is suitable for use in the other figures illustrated and described herein. Computer 104 has one or more processors or processing units and a system memory. The computer 104 typically has at least some form of computer readable media. Computer readable media, which include both volatile and nonvolatile media, removable and non-removable media, may be any available medium that may be accessed by computer 104. By way of example and not limitation, computer readable media comprise computer storage media and communication media. Computer storage media include volatile and nonvolatile, removable and non-removable media implemented in any method or technology for storage of information such as computer readable instructions, data structures, program modules or other data. For example, computer storage media include RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium that may be used to store the desired information and that may be accessed by computer 104. Communication media typically embody computer readable instructions, data structures, program modules, or other data in a modulated data signal such as a carrier wave or other transport mechanism and include any information delivery media. Those skilled in the art are familiar with the modulated data signal, which has one or more of its characteristics set or changed in such a manner as to encode information in the signal. Wired media, such as a wired network or direct-wired connection, and wireless media, such as acoustic, RF, infrared, and other wireless media, are examples of communication media. Combinations of any of the above are also included within the scope of computer readable media.

The computer 104 connects to an application server 106 through a network 108 connection. In one embodiment, the network is a global communication network such as the Internet. The computer 104 may operate in a networked environment using logical connections to one or more remote computers, such as an application server 106. The logical connections depicted in FIG. 1 include a local area network (LAN) and a wide area network (WAN), but may also include other networks. LAN and/or WAN may be a wired network, a wireless network, a combination thereof, and so on. Such networking environments are commonplace in offices, enterprise-wide computer networks, intranets, and global computer networks (e.g., the Internet).

In FIG. 1, the application server 106 hosts a virtual compression program 110, which allows a user to modify files associated with the portable media drive 102. In an embodiment, the virtual compression program 110 is launched after the computer 104 connects to the application server 106. The application server 106 has access to a storage server 112 having one or more remote storage devices 114. In one embodiment, the application server 106 and the storage server 112 are the same server. In an alternative embodiment, the application server 106 has access to the storage server 112 through the network 108. The remote storage device 114 contains one or more portions of files associated with the portable media drive 102.

In an embodiment, the portable media drive 102 is a commercial off-the-shelf type USB Flash drive that has been prepared for use with the system. The portable media drive 102 may be distinguished from other portable media drives by creating a partition on the portable media drive 102 that is not visible to ordinary operating systems. Data required for the virtual compression is then written to the sectors within that partition. Alternatively, alterations are made to the hardware interface of the portable media drive 102 to configure the portable media drive for use with the system. As a third alternative, special purpose portable media drives 102 are manufactured such that the system will recognize them.

The virtual compression program 110 can be built from various technologies, and is initially deployed from the application server 106 to the computer 104. For example, an executable version of the virtual compression program 110 can be first downloaded to the portable media drive 102, and then executed by the processor of computer 104 (or the processor of server 106) to perform the process in conjunction with additional browser-based elements. Alternatively, needed files can be stored on the portable media drive 102. In an embodiment, the virtual compression program 110 is implemented using smart client technology. Smart client technology generally refers to applications which are delivered over the web, do not require installation on a client computer, automatically update without user action and have the look and feel of desktop applications.

Designed in this way, an instance of the virtual compression program 110 will be deployed by the application server 106 and executed by its processor, but launched and executed within the controlled environment of the computer 104. Advantageously, this allows the virtual compression program 110 to gain access to the local drives of the computer 104, unlike a strictly browser-based application. Additionally, since the virtual compression program 110 executes locally on the computer 104, the file being compressed is protected from direct exposure to the Internet. Consequently, malicious interception of virtual compression program 110 outputs will not result in the compromise of file content. As a third advantage, because the virtual compression program 110 executes locally, demands on the application server 106 resources are limited.

Figure 2:
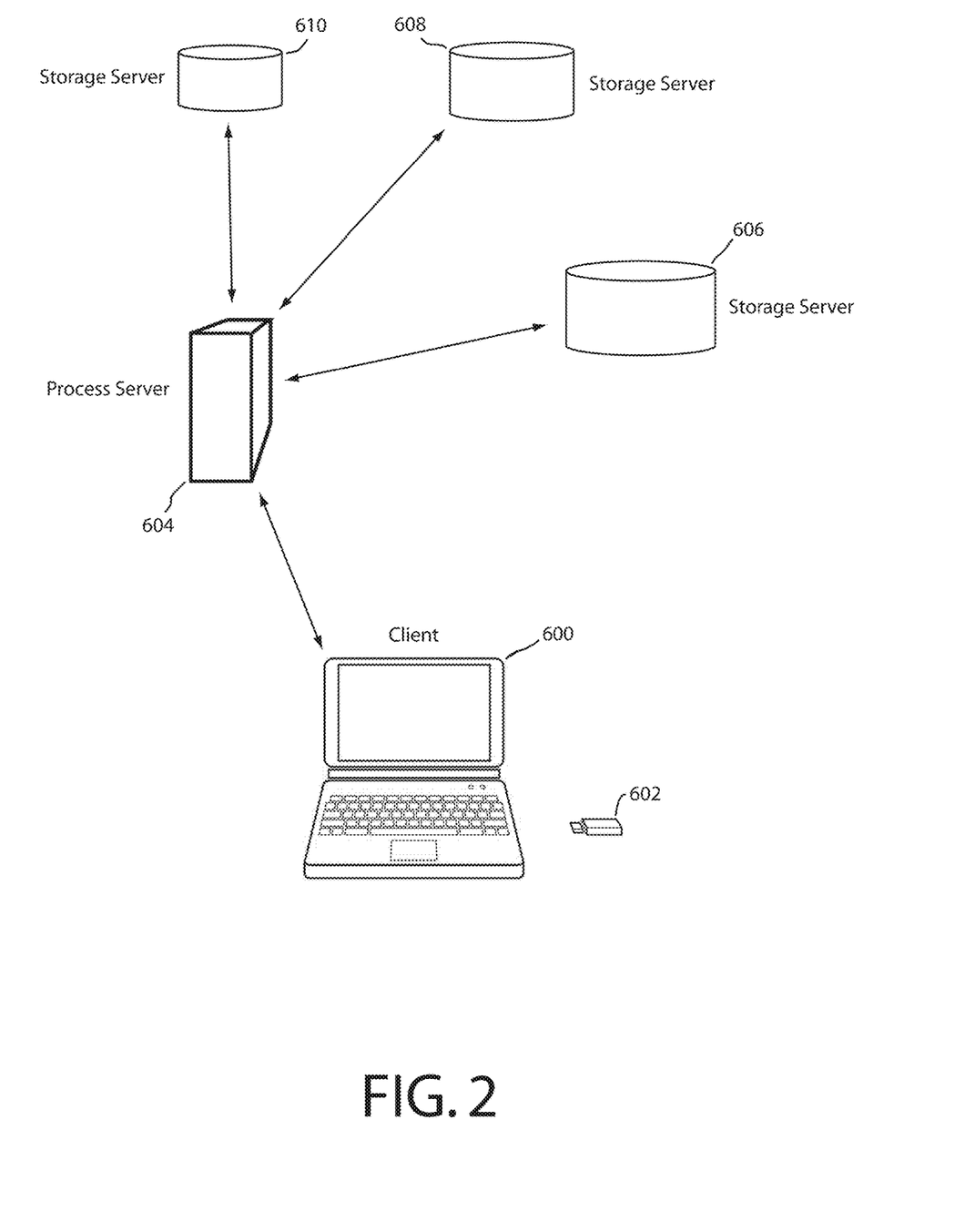
FIG. 2 is a block diagram illustrating a second example of a suitable computing system environment in which aspects of the invention may be implemented.

Another example of a suitable computing environment for compressing and storing files is illustrated in FIG. 2. Client computer 600 typifies a user machine. Portable media 602 may be attached to and removed from client computer 600 at will, and by way of example represents a USB Flash drive. Client computer 600 further connects to process server 604 and a distributed process results from operations performed at both. Multiple storage servers 606, 608 and 610 are made available to the process server 604, though any arbitrary number and arrangement of remote storage servers is within the scope of the invention. Innumerable wired and wireless technologies exist, from among which one or more may be chosen as the means for establishing high-speed connections between the various illustrated components. Furthermore, distances separating the process server 604 from both the client computer 600 and storage servers 606, 608 and 610 are constrained only by the particular choice of connection technology.

A brief overview of using the system of FIG. 2 is introduced here and detailed later. Upon attaching portable media 602 to client computer 600, a user may begin by choosing a file for processing. The source of a chosen file is unimportant and the possibilities are not limited to client computer 600 and portable media 602. A application program created for purposes of this example resides on client computer 600 or on the media 602 and executes the appropriate instructions. For example, the client computer 600 may be running the virtual compression program itself or a deployed version, as described earlier. In accordance with the user's selection, processing of the chosen file commences. Remote portions of the chosen file are produced and dispatched to the process server 604. Portions of the file may be generated via any of the partitioning approaches described herein. Process server 604 forwards each of the produced portions to one of the storage servers 606, 608 and 610 without reference to other portions, the originating file, or to the user. Decisions regarding exact storage locations are made by the process server 604 and are hence independent from operations performed on client computer 600. When complete, a resulting single local or terminal portion is stored on portable media 602. The same file may later be resolved by providing the program access to the corresponding single terminal/local portion produced previously, whereupon operations are performed that are essentially the reverse.

Although described in connection with the exemplary computing system environments of FIGS. 1 and 2, embodiments of the invention are operational with numerous other general purpose or special purpose computing system environments or configurations. The computing system environment is not intended to suggest any limitation as to the scope of use or functionality of any aspect of the invention. Moreover, the computing system environment should not be interpreted as having any dependency or requirement relating to any one or combination of components illustrated in the exemplary operating environment. Examples of well known computing systems, environments, and/or configurations that may be suitable for use with aspects of the invention include, but are not limited to, personal computers, server computers, hand-held or laptop devices, multiprocessor systems, microprocessor-based systems, set top boxes, programmable consumer electronics, mobile telephones, network PCs, minicomputers, mainframe computers, distributed computing environments that include any of the above systems or devices, and the like.

Embodiments of the invention may be described in the general context of computer-executable instructions, such as program modules (e.g. virtual compression program 110), executed by one or more computers or other devices. Generally, program modules include, but are not limited to, routines, programs, objects, components, and data structures that perform particular tasks or implement particular abstract data types. Aspects of the invention may also be practiced in distributed computing environments where tasks are performed by remote processing devices that are linked through a communications network. In a distributed computing environment, program modules may be located in both local and remote computer storage media including memory storage devices.

Figure 3:
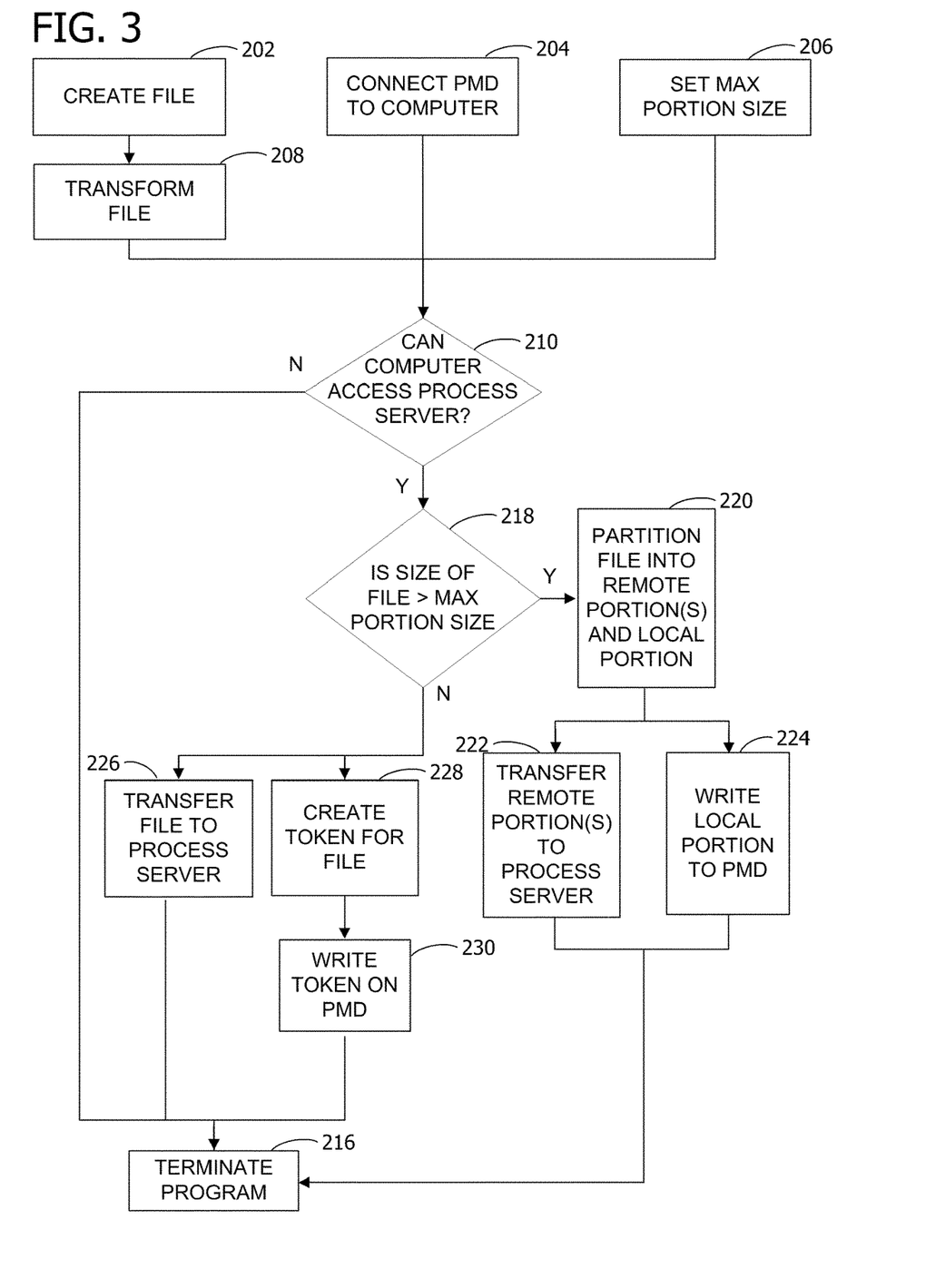
FIG. 3 is an exemplary flow diagram illustrating one embodiment of computer executable instructions executed by a processor for accomplishing virtual file compression and storage according to the invention.

FIG. 3 is a flow diagram for a method of virtually compressing and storing a file according to an embodiment of the invention, using the system of FIG. 2 for purposes of explanation. At 202, a file is created and at 204, the portable media drive (PMD) 602 is connected to the computer 600. At 206, a maximum portion size is determined. For example, the maximum portion size may be equal to the size of a packet.

At 208, the file is transformed to introduce non-deterministic variation. In an embodiment, transforming includes at least one of the following: compressing the file and reorganizing the file. For example, real data compression consists of first applying a block-sorting algorithm such as the Burrows-Wheeler Transform, followed by entropy encoding, such as Huffman Coding. The blocksorting algorithm does not perform compression by itself, but enhances the entropy encoding that follows. The exact operations used to perform real data compression will depend on the type and size of file selected.

Reorganization includes bit-wise reorganization not aligned with the byte boundaries in the source file, nibble-wise reorganization and byte-wise reorganization. For example, nibble-wise reorganization separates the upper nibbles from the lower nibbles of the hexadecimal equivalent of each byte and groups are moved to different regions of the file producing a transformation. In another example, byte-wise reorganization consists of shuffling bytes of nibble-wise reorganization, resulting in newly adjacent relationships not resembling those of the original data. In a third example, bit-wise reorganization separates the file into n-bit groups and the groups are moved to different regions of the file producing a transformation. In an alternative, the n-bit group is not aligned with the bytes boundaries of the file (i.e., 3-bit or 10-bit groups). The exact operations used to perform reorganization will depend on the type and size of file selected. After the file has been transformed and reorganized, the data of the file is noncontiguous (i.e., the data is no longer in the sequence of the original file).

At 210, a check is made that the computer 600 can access the process server 604. If the computer 600 cannot access the process server 604, the program terminates at 216.

If the computer 600 can access the process server 604, at 218, it is determined if the size of the file is greater than the maximum portion size that was determined at step 206. If the file size is greater than the maximum portion size, at 220 the file is partitioned into one or more remote portions and a local portion including the remaining data of the file. In an embodiment, the data of the remote and local portions are not overlapping, such that the remote portion and the local portion include one copy of the original file data. Additionally, because the original source file is transformed at 208, each portion (local and remote) contains noncontiguous, scattered data from the original source file.

Figure 4:
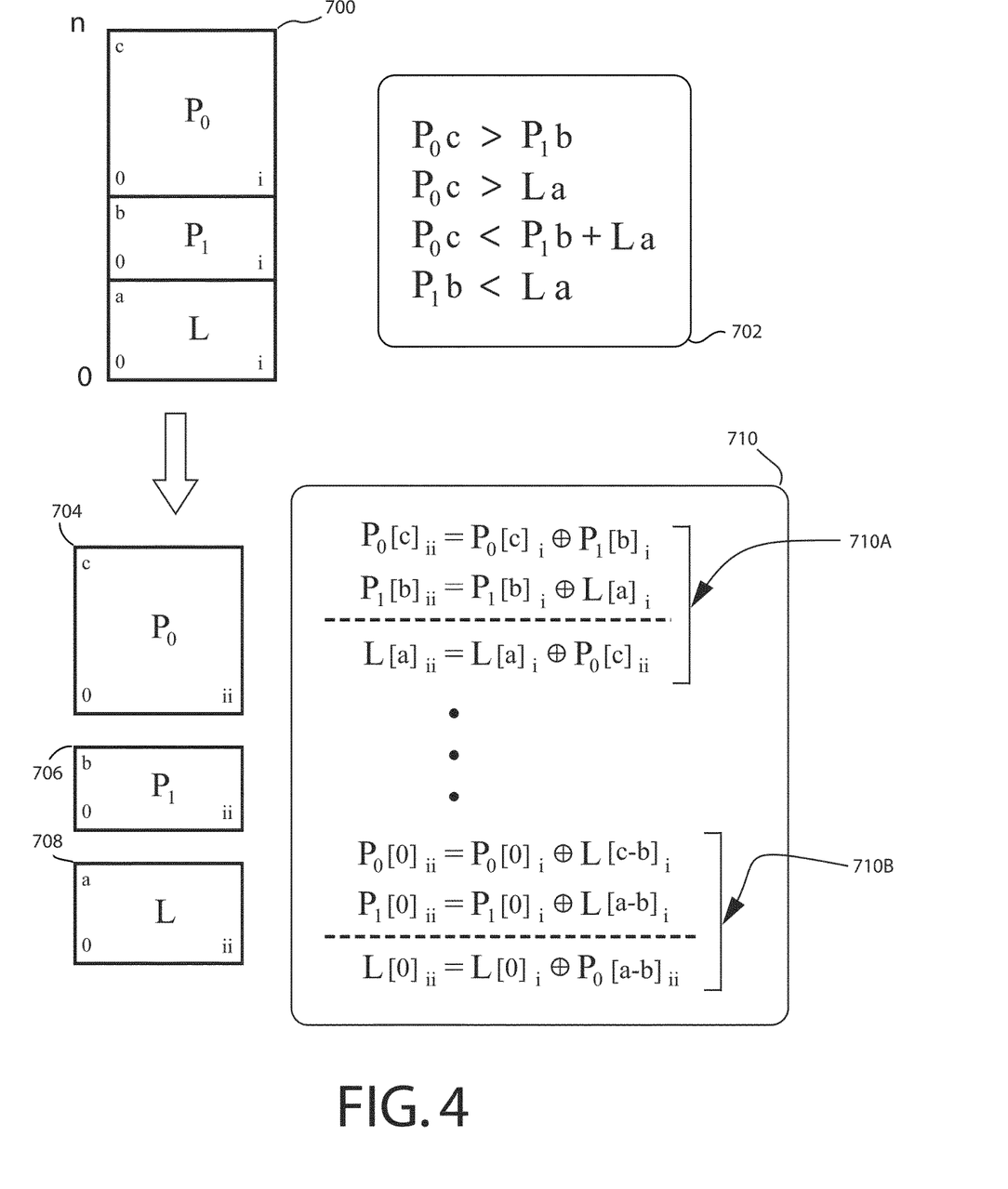
FIG. 4 is a block diagram illustrating a method of computer executable instructions executed by a processor of file storage according to one embodiment of the invention.

FIG. 4 illustrates one embodiment of a method for generating remote and local portions at step 220 of FIG. 3. The transformed file 700 of size or length 'n' is completely copied into memory and simultaneously split into a predetermined number of portions. In the illustrated example, file 700 is split into remote portions 704, 706 and local portion 708 of sizes 'c', 'b' and 'a' respectively. The number of portions and the size of each portion is calculated concurrently based on a set of pre-specified constraints 702, including the relationship of the portions based on their size. As specified in 702 for example, remote portion 704 (designated $P_0$, of size 'c') is larger than each of remote portion 706 (designated $P_1$, of size 'b') and local portion 708 (designated L, of size 'a'), but smaller than the combination of the two. In an embodiment, the constraints 702 ensure that the portions 704, 706 and 708 are sized to allow logical operations (described below) to be performed on all portions, since an entire portion can only be wholly modified against a larger portion. Generating any number of portions and employing other constraints is within the scope of aspects of the invention.

Following the partitioning of file 700 into portions 704, 706 and 708, individual modification of each portion commences with the identification of the local portion 708. Logical operations, such as Exclusive OR for example, are sequentially performed on all Boolean constituents of each portion according to an exemplary sequence illustrated in formula block 710. Logical operations 710A operate on one end of the file and begin with remote portion 704. The original file data is designated as 'i', while the modified portion data is designated as 'ii'. In the illustrated example, each portion is modified bitwise along its length, starting at one end and with resulting bit $P_0[c]_{ii}$. The bit $P_0[c]_i$ is replaced with an XOR operation performed between its current value as inherited from the original file 700 and the end bit $P_1[b]_i$ of portion 706 ($P_1$) to yield $P_0[c]_{ii}$. Similarly, end bit $P_1[b]_i$ of portion 706 is updated with the result of an XOR operation between its inherited value and the end bit $L[a]_i$ of local portion to yield $P_1[b]_{ii}$. Then, end bit $L[a]_i$ of the local portion 708 is updated with the result of an XOR operation between its inherited value and the already modified end bit $P_0[c]_{ii}$ of remote portion 704 to yield $L[a]_i$. Hence, logical operations performed on the constituents of local portion 708 can readily be seen to include operands which are the results of previous operations on remote portion 704. Bit-wise logical operations on subsequent bits of each portion then continue from that point, thereby replacing the content of each portion with the results of the logical operations.

All logical operations must account for the dissimilar sizes of portions. For example, remote portion 704 is the largest portion, but it can still be wholly modified by the yet larger combination of portions 706 and 708 due to the constraints 702 described earlier. Logical operations 710B hence reflect an example of the appropriate indexing in such cases. As seen, end bit $P_0[0]_{ii}$ is generated with the result of an XOR operation between its inherited value (designated by $P_0[0]_i$) and the bit $L[c-b]_i$ of local portion 708. Modifications can be made to the end bits of portions 706, 708 as well by appropriate indexing keeping portion sizes in mind.

In an embodiment, the constraints 702 permit a range of sizes for each portion. While all portions sizes must obey the constraints 702, a measure of variance is allowed within the range while determining portion size. The benefit of this approach is to enhance and introduce further non-deterministic variation. Such variation ensures that unique portions are produced even for identical files, and also yields unique portions for every instance of processing the same file.

After completing logical operations, each portion is given a unique name based on the content of the remaining portions. For example, remote portion 704 is given a name based on the value of the constituents of portions 706 and 708, and is then considered ready for storage. Remote portion 706 is given a name based on the value of the constituents of local portion 708.

In am embodiment, the method illustrated in FIG. 4 is especially useful for storing smaller files.

Figure 5:
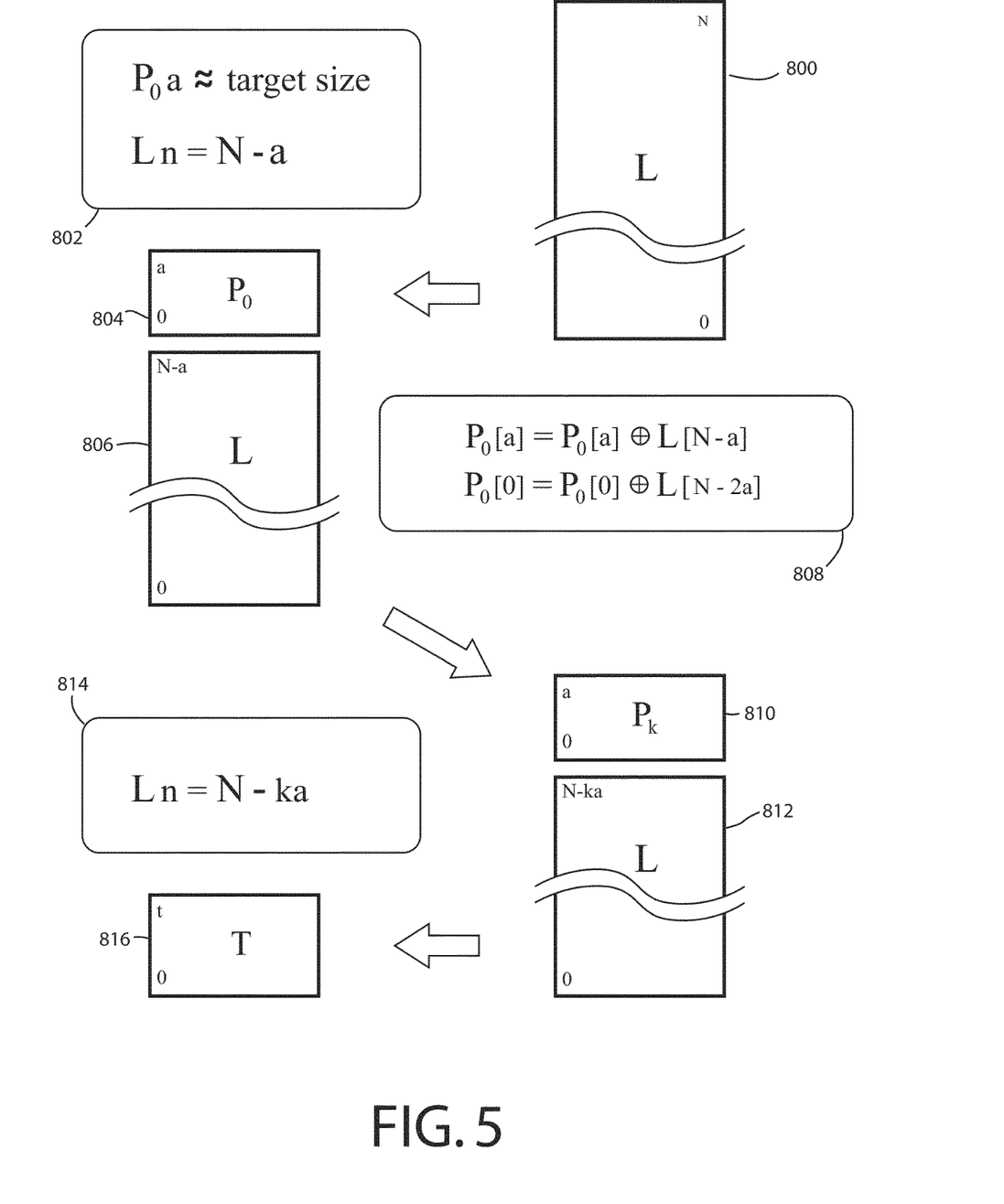
FIG. 5 is a block diagram illustrating a method of computer executable instructions executed by a processor of file storage according to another embodiment of the invention.

FIG. 5 illustrates another embodiment of a method for generating remote and local portions at step 220 of FIG. 3. Transformed file 800 of length N is completely copied into memory. In this embodiment, portions are separated from the file 800 sequentially, and processing performed on each separated portion sequentially in turn before separating another portion. The size of a portion to be generated is the result of a targeted determination made as illustrated by target size 'a' in formula block 802, although it may include non-deterministic variation within an acceptable range of portion sizes as described earlier. The length of the remainder portion is equal to the difference (N–a) as illustrated in 802. In an embodiment, the targeted determination is made such that the size of the remote portion is always smaller than the size of the remainder portion to allow complete modification of the remote portion against the remainder portion.

In the illustrated embodiment, file 800 is separated into a first remote portion 804 of length 'a' per the formula block 802, leaving a reminder portion 806 of length N–a. As indicated in figure block 808, XOR is the exemplary logical operation then performed bitwise between the constituents of the first remote portion 804 and the remainder portion 806. For example, end bit $P_0[a]$ is replaced by XORing it against end bit $L[N-a]$ of the remainder portion 806, and end bit $P_0[0]$ is replaced by XORing it against bit $L[N-2a]$ of the remainder portion. Following the logical operation(s), a unique name is attached, appended, created within, or otherwise integrated into the first remote portion 804 that is based on the value of the constituents of the remainder portion 806. First remote portion 804 is then deemed ready for remote storage.

Additional remote portions 810, each of size 'a', are similarly and sequentially generated, leaving behind successively smaller remainder portions 812. In the illustrated embodiment, 'k' remote portions are generated overall, leaving behind a remainder portion of size N–ka as shown in formula block 814. In an embodiment, when the remainder portion 812 approaches a prespecified terminal size 't', it is deemed a terminal portion 816. Processing of the terminal portion 816 is then completed as illustrated in FIG. 4, such as by generating additional remote portions 704, 706 and a local portion 708 from the terminal portion 816. The number of additional remote portions and size of each additional remote portions are constrained to permit complete modification of each portion as described earlier. Then, logical operations are performed on each additional remote portion. Finally, unique names are assigned to each modified portion that are indicative of the content of the other additional portions before the additional remote portions are deemed ready for remote storage. The remainder of the terminal portion 816 is then deemed a local portion for local storage to the portable media.

This approach of treating the terminal portion 816 as a small file assures that all the Boolean constituents of the terminal portion 816 are replaced. In general, the method of FIG. 5 may be preferentially applied to medium sized files.

Figure 6:
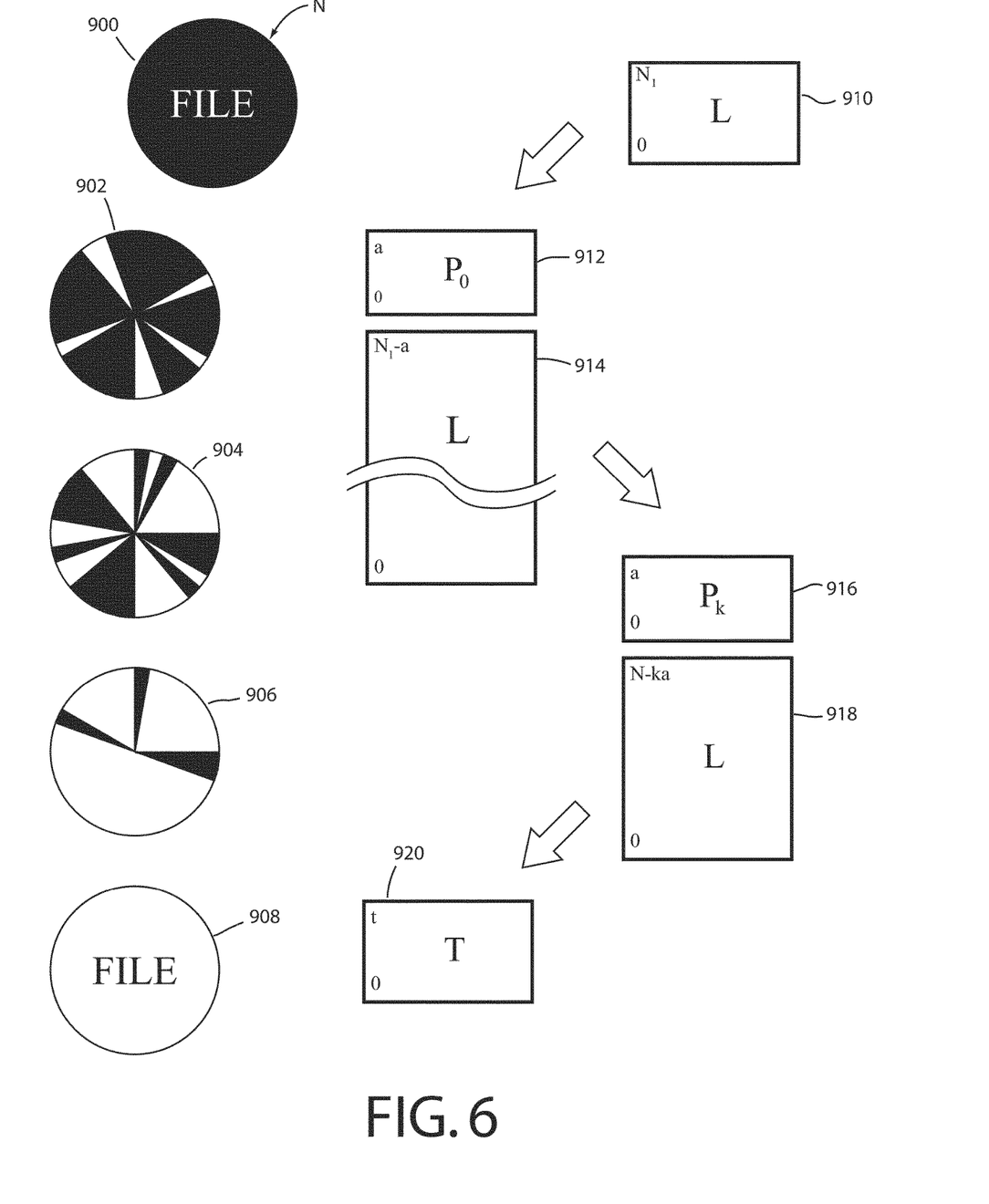
FIG. 6 is a block diagram illustrating a method of computer executable instructions executed by a processor of file storage according to another embodiment of the invention.

FIG. 6 illustrates another embodiment of a method for generating remote and local portions at step 220 of FIG. 3. In this embodiment, transformed file 900 is used to generate an initial file segment 910 in memory that comprises a subset of the data of file 900. The data used to generate the file segment 910 is then removed from file 900, thereby resulting in file 902 for example, where the white spaces are indicative of the removed data. The file segment 910 is then used to generate portions. In one embodiment, file segment 910 must have a minimum length before separating a portion of predetermined size. To achieve and maintain this minimum length, data is removed from file 900 and added to the file segment 910 incrementally as required during portion generation. Files 902, 904 and 906 are hence indicative of progressive data removal (as indicated by the white spaces) from file 900, while element 908 is symbolic of the entire file 900 having been emptied.

In an embodiment, the incremental file data removal is arbitrary and non-deterministic, and hence unique to each process instance. In one method of achieving incremental file data removal, the data of file 900 is specified as a plurality of stations, each corresponding to a targeted yet variable station size. The target station size may be related, but not necessarily equal, to the maximum portion size. The beginning location of the first station within the file 900 is randomly or otherwise specified, and other stations are specified thereafter, each with a variable length. The circular illustration of file 900 is indicative of the possibility that one of the stations may 'wrap' around the end of the file. In other words, a station may include data from both the end and the beginning of file 900. Thus, stations do not overlap, but join. In other words, stations pertain to the order in which a file is read. For example, suppose a file is 4000 bytes long and read in as follows. Station 1 randomly begins at byte 2100 and is randomly 1100 bytes long. Station 2 would begin at byte 3200. It is randomly 900 bytes long and would have to end at byte 100 since it "wraps" around the end of the file. Then Station 3 would begin there and is randomly 1200 bytes long. Station 4 must begin at byte 1300 and must be 800 bytes long. After the stations are decided, the file is read in using a random sequence such as Station 2, Station 4, Station 3, Station 1. Portions are produced later, in a block of memory that was read in from the file, as described above.

Finally, stations are copied one at a time in random order to build up the file segment 910 as necessary. Although file 900 is specified as a transformed file, it is also possible that when file 900 is read into file segment 910 in this manner, compression and other transformations are carried out on each station instead and not the entire file 900 beforehand. This station information is then added to the file metadata to facilitate accurate reconstruction.

As a result of this approach, remote portions can be made ready before all the data of the file 900 has been removed. This approach is beneficial for compressing and storing relatively large files that may consume excessive resources if loaded into memory in their entirety, and improves security by non-deterministic (rather than linear) copying of file content.

As illustrated in FIG. 6, an initial file segment 910 of length $N_1$ of file 900 is generated as described earlier, where $N_1$ is greater than the minimum length for generating portions but lesser than length N of the file 900. The file segment 910 is then separated into a first remote portion 912 of length 'a' and a first remainder portion 914 of length $N_1-a$. Logical operations are performed to modify the constituents of the first remote portion 912 against the constituents of the first remainder portion 914, as specified and described in formula block 808 for example. Following logical operations, the value of the constituents of the first remainder portion 914 becomes the basis of a unique name subsequently attached, appended, created within, or otherwise integrated into the first remote portion 912. The first remote portion 912 is then deemed ready for remote storage.

The remainder portion 914 may then be used to generate additional portions, or grown using data removed from the file 900 as described earlier. Ultimately, the entire contents of file 900 have been consumed, and partitioning has resulted in 1) k remote portions (collectively designated by the item 916) each of size 'a', and 2) a remainder portion 918 of size N−ka that is deemed a terminal portion 920 when it approaches a terminal length 't'. As stated earlier, each remote portion is subjected to logical operations upon generation and given a unique name based on the value of the constituents of the remainder portion at the time the determination is made.

In an embodiment, processing of the terminal portion 920 is then completed as in FIG. 4, such as by generating two additional remote portions and a local portion (not shown) from the terminal portion 920 and performing logical operations on each. This approach of treating the terminal portion as a small file assures that all the Boolean constituents of the terminal portion 920 are replaced. The process is completed when the additional remote portions are assigned unique names as described above and are deemed ready for remote storage. The remainder of the terminal portion 920 is deemed a local portion for storage onto the portable drive.

Returning to FIG. 3, regardless of the approach used to generate remote and local portions, at 222, the remote portions are transferred to the process server 604. The local portion is stored to the portable media drive 102 at 224. In one embodiment, all remote portions ready for storage are accumulated on the client computer and are collectively dispatched to the process server when file processing is complete. In another embodiment, each remote portion is dispatched to the process server as soon as it is deemed ready for storage.

Notably, for each embodiment of file storage, the same steps may later be reversed and the partitioned file accurately reconstructed. Referring to the method of FIG. 4, as described earlier, the value of the constituents of local portion 708 stored on the drive 602 form the basis of the unique name of the last portion (i.e. remote portion 706) produced and what is the first portion needed to commence reassembly of the file.

In an embodiment, the unique names are masked upon generation so they may be securely copied elsewhere. This approach accounts for the possibility that the local portion is inadvertently modified or deliberately tampered with, such that evaluating its constituents does not yield the correct unique name of the next portion. In such an event, the copy of the unique name may be relied on. Any suitable mask may be used. The mask is stored as part of the file or portion metadata for accurate unique name retrieval.

A request for remote portion 706 is made by providing the determined unique name of remote portion 706 to the process server 604 without any knowledge of its actual storage location. The process server 604 performs an internal lookup to determine the storage location of the remote portion 706 (storage server 608, for example) and proceeds to retrieve it. The retrieved remote portion 706 is then returned to the client computer 600. The local portion 708 and remote portion 706 are recombined, and as before, the value of the constituents of the combination yields the unique name of the first portion produced (i.e. remote portion 704) and, in the illustrated example of FIG. 4, what is the last portion needed to complete reassembly of the file. In an embodiment, file metadata may be used for recombining portions. This is beneficial for reconstruction files that were not linearly split, such as via the method of FIG. 6 for example.

The unique name as determined from the combination of portions 706, 708 is sent to the process server 604, which responds by looking up the corresponding location (storage server 610, for example) and subsequently retrieving remote portion 704, and returning it to the client computer 600. Once portion 704 has been retrieved and recombined with portions 706 and 708, the logical operations illustrated in formula block 710 may then be reversed on all Boolean constituents of each portion to retrieve the original content of the transformed file 700. Finally, decompression and the reverse of other file transformations are performed as needed.

Advantageously because the file 700 has been non-deterministically modified multiple times (i.e., when transformed before partitioning, when portions are generated, and for the specific case of large files being incrementally read into memory), the file cannot be readily accessed and compromised from the local portion 708 of the file if the portable media drive 602 is lost or stolen. The remote portions 704, 706 are treated as individual files by the process server 604 for storage. The contiguous dependency of the portions of a file transformation is determinable only by the compression program, and the file can be reassembled only after all the portions has been reacquired on a client machine. In general then, the storage size of the file on the virtual file system is approximately equal to a storage size of the local portion on the portable media drive 602. To reassemble the file, the portions written to the storage servers 606, 608 and/or 610 are retrieved and combined with the local portion remaining on the portable media drive 602.

Referring again to FIG. 3, if it was determined at 218 that the file size is less than the maximum portion size, at 226 the file is transferred to the process server 604 for storage. At 228, a token or identifier is created for the file and, at 230, the token or identifier is written to the portable media drive 602. The storage size of the file on the virtual file system is approximately equal to zero. In an embodiment, the token is hidden on the portable media drive 602. Alternatively, the user may email the token to his or herself. In yet another alternative, a copy of token is saved on the client computer 600. By doing so, the user is afforded the option to return to the computer 600 in the event their portable media drive 602 is no longer accessible (e.g. lost, stolen, damaged or corrupt). The program then terminates at 216. Alternately, the file size is deemed less than the maximum portion size at 218 and the entire file may be stored, along with it's metadata, in a directory node as described above.

In general, the approach selected to generate local and remote portions at step 220 is not only file-sized dependent, but also based on ensuring that all file contents are modified. Hence, the maximum portion size is based on efficiency considerations. If three portions is considered efficient, the file may be considered a small file, and processed as illustrated in FIG. 4. If more than three portions are possible, the file is treated as a medium file where at least one portion is separated and treated against the remainder of the file (see FIG. 5). Once the remainder is small enough, it is processed as a small file to achieve the benefits of local portion modification. A large file is treated similar to medium files in terms of generating portions with the consideration that the large file, being too big to exist wholly in memory, is copied piecemeal to memory as required (FIG. 6).

Figure 7:
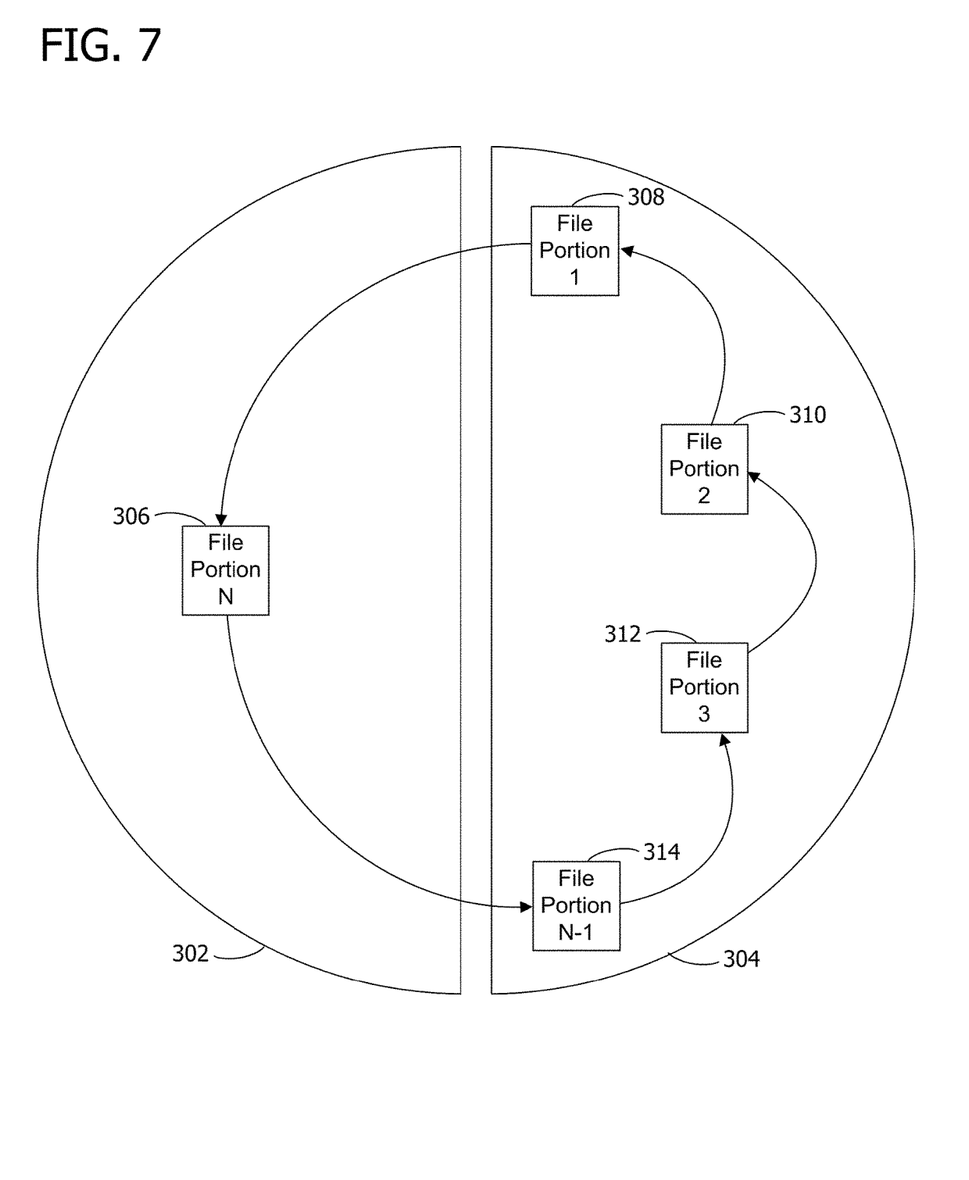
FIG. 7 is a block diagram illustrating local and remote storage of a virtual file system according to an embodiment of the invention.

In FIG. 7, the two realms of virtual space are illustrated, local 302 (e.g. portable media drive 102) and remote 304 (e.g. remote storage device 114 of FIG. 1, or the process server 604 and the plurality of storage servers 606, 608, 610 of FIG. 2). In this example, the file consists of N portions, one local portion 306 and N−1 remote portions 308, 310, 312, 314. A physical separation exists between the local portion 302 and remote portion 304, yet each of the portions are contiguously dependent as shown by lines of dependency connecting the portions 306, 308, 310, 312, 314. Contiguous dependence indicates an order of retrieval of portions necessary to reconstitute the original file, and not necessarily contiguity of content or indicative of portions referencing other portions. The Nth portion, i.e., local portion 306 remains in local storage, and accounts for the total apparent size of the file on the portable media drive 602. A second portion, when recombined with the local portion, contains the identity of the successive portion, and so forth. For example, the local portion 306 contains the identity (e.g. a unique name based on the contents of the local portion) of the successive (N−1) remote portion 314 and remote portion-3 312, when recombined with all previous portions 312, 314 contains the identity of successive remote portion-2 310, and so forth.

Only when all the portions are brought together can the file be recovered in its original state. The identity of the successive portion can be expressed any way as long the identify can be definitively determined. For example, the identity may be expressed as the unique name, or as a pointer, physical address, logical address, database location, file name, or some function of the identity (e.g. such as a hash of the physical location).

Common to all approaches to generate portions is the need to store operational file metadata at each step for accurate reconstruction of the file starting with the local portion at a later time. Operating systems commonly store and display higher level file metadata to the user, along with a directory organization of the files. Directory nodes, or folders, are virtual files themselves that store metadata about the constituent files within the folder. The current invention provides a similar folder view to the user (see FIG. 8), where the user is oblivious of the fact that the displayed file exists on the drive as a local portion. The metadata of each displayed file is enhanced to include partitioning information. Such partitioning information may include, but is not limited to, portion information, station information, masks used, whether the file was compressed, transformations used, etc. Then, if the user selects a file to open via the interface of FIG. 8, clicking on it would activate the reconstruction process for the selected file using the partitioning information associated with it.

In one embodiment, the file metadata (including partitioning information) for each displayed file is stored in its parent folder. The parent folder may be part of a hierarchy of folders (similar to any directory structure), and the file metadata may be instead stored or otherwise replicated to any folder above the parent folder in the hierarchy, all the way up to a root folder. This approach is beneficial for preventing a malicious user from identifying a local portion on the drive via flat searching (i.e. no directory information) without using the interface of FIG. 8, since the partitioning information will not be associated with the local portion.

Figure 8:
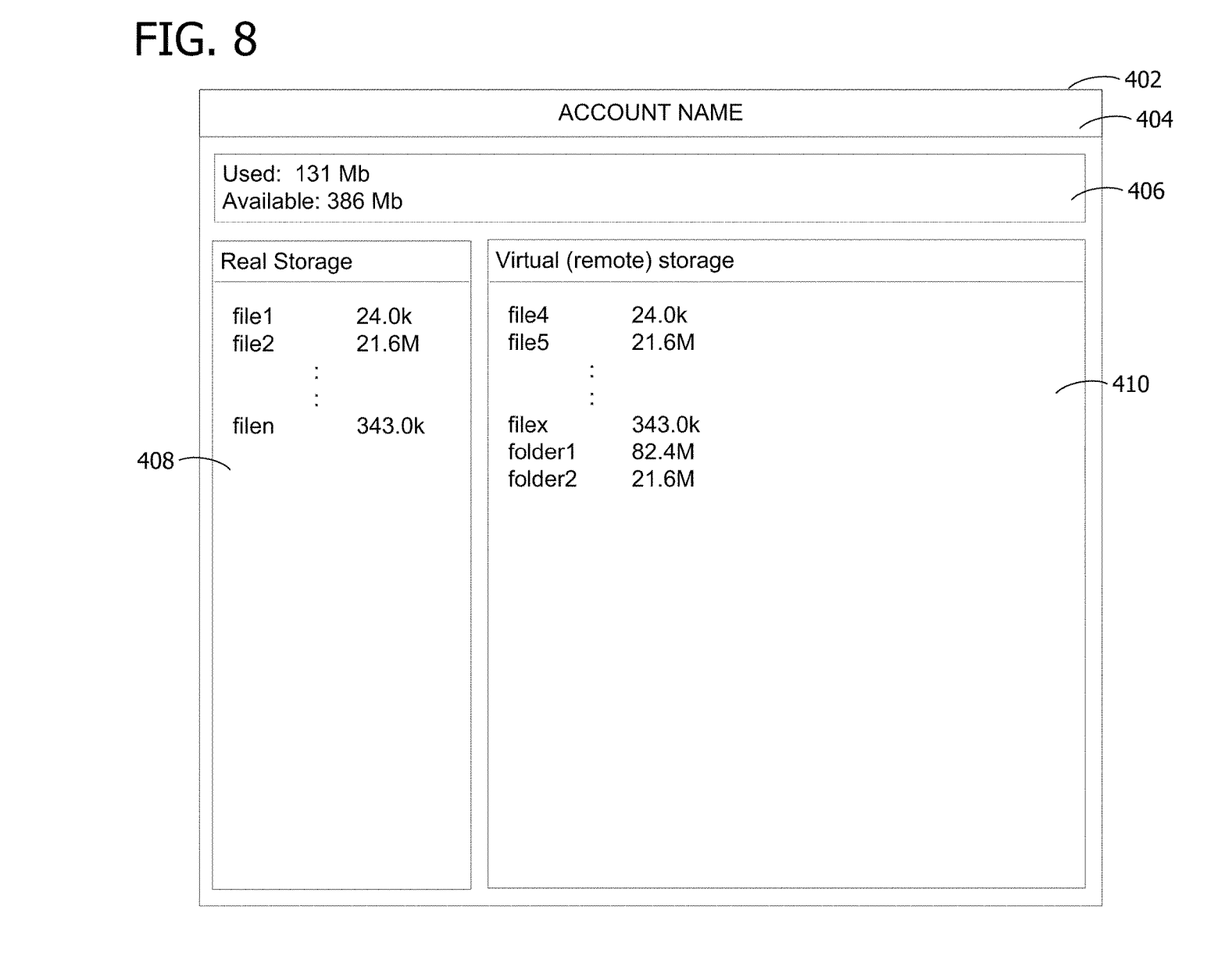
FIG. 8 is a block diagram illustrating an exemplary user interface for a virtual file system of the invention.

FIG. 8 also generally illustrates an embodiment of a graphical user interface 402 of the virtual compression program 110 of FIG. 1, also operable with the system of FIG. 2. Following authentication of the portable media drive 102, an account title bar 404 corresponding to the portable media drive 102 is displayed to the user. In one embodiment, the graphical user interface 402 appears automatically in response to the portable media drive 102 being connected to the computer 104.

The graphical user interface 402 displays virtual space 406, showing both used and available space. The left panel 408 lists files stored locally on the portable media drive 102. The right panel 410 lists files stored in the virtual space that exists across both the portable media drive 102 and the remote storage device 114. In this manner, a virtual space is created and the files of the virtual space are only accessible on the portable media drive 102 via the virtual compression program 110. In one embodiment, the virtual space is much larger than the capacity of the portable media drive 102.

Figure 9:
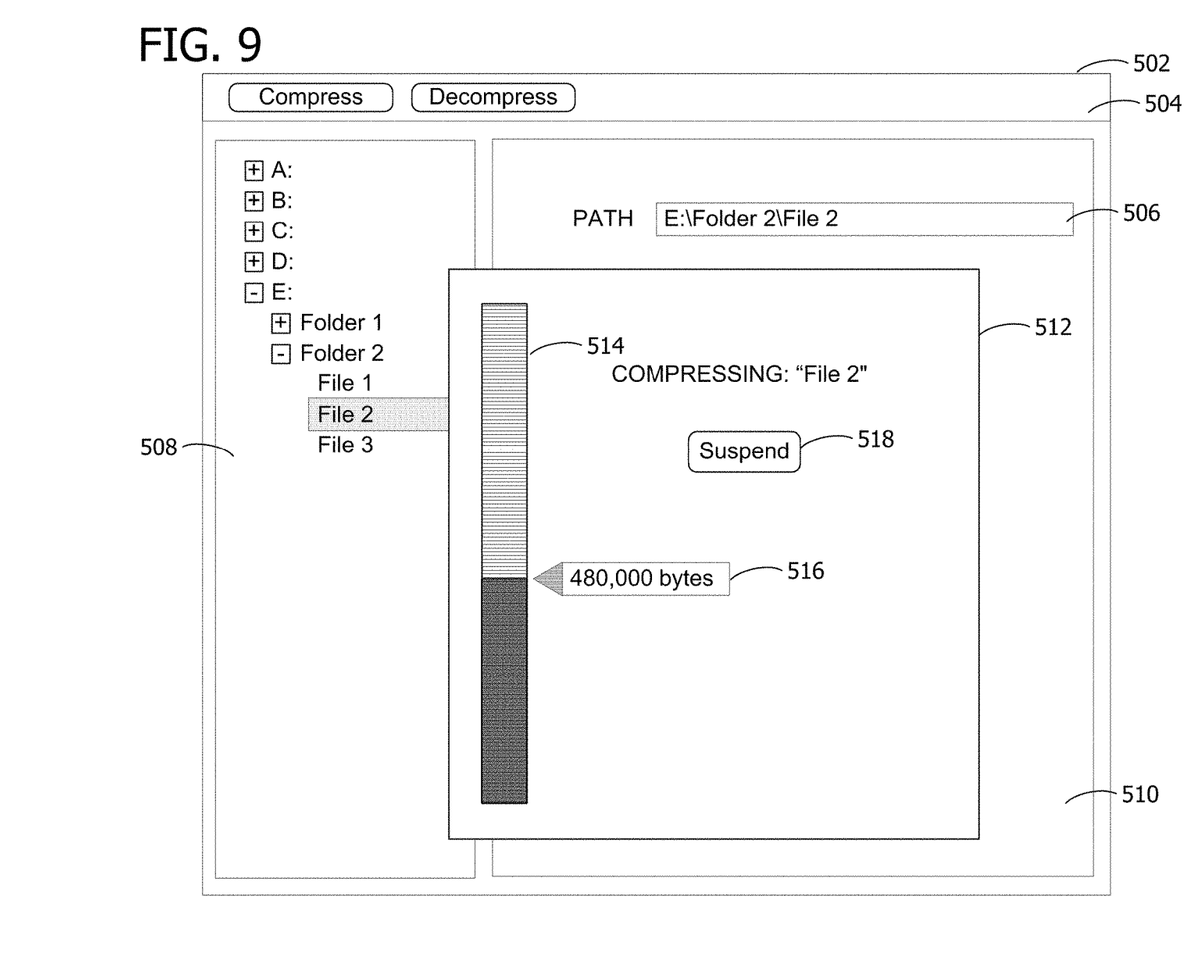
FIG. 9 is a block diagram illustrating an exemplary user interface for a virtual file compression program of the invention.

Alternatively, FIG. 9 illustrates an embodiment of a graphical user interface 502 of the virtual compression program 110 where the files of the portable media drive 102 may be virtually compressed and decompressed. The graphical user interface 502 displays a toolbar 504 offering the user access to the virtual compression program 110 functionality. Following authentication of the portable media drive 102, a directory tree of drives accessible to the virtual compression program 110 are displayed in the left panel 508. The drive letter corresponding to the portable media drive 102 (e.g., E:) appears among the disc drives. Files and folders may be selected and highlighted (e.g., File 2). Details pertaining to the selection displays in the right panel 510. For example, the path of the selected file 506 is displayed. Once the virtual compression or decompression option is selected from the toolbar 504, a progress window 512 is displayed. Within the progress window 512, a vertical progress bar 514 or some other form of graphical representation displays the proportional relationship between local storage (e.g. the portable media drive 102) and remote storage (e.g. remote storage device 114) for the selected file. In one embodiment, during virtual compression a solid pointer indicates the local storage occupied by the file is diminishing and an open pointer is indicates the local storage occupied by the file is increasing. The actual amount of local storage on the portable media drive 102 is displayed in a size box 516. The suspend button 518 allows the user to suspend either virtual compression or virtual decompression at any point during the process, accepting the partial results. The process can be resumed at another location and/or at another time. The process can also be reversed at will. This flexibility permits a user to adjust as needed, the local storage occupied by a given file.

The order of execution or performance of the operations in embodiments of the invention illustrated and described herein is not essential, unless otherwise specified. That is, the operations may be performed in any order, unless otherwise specified, and embodiments of the invention may include additional or fewer operations than those disclosed herein. For example, it is contemplated that executing or performing a particular operation before, contemporaneously with, or after another operation is within the scope of aspects of the invention.

Embodiments of the invention may be implemented with computer-executable instructions. The computer-executable instructions may be organized into one or more computer-executable components or modules. Aspects of the invention may be implemented with any number and organization of such components or modules. For example, aspects of the invention are not limited to the specific computer-executable instructions or the specific components or modules illustrated in the figures and described herein. Other embodiments of the invention may include different computer-executable instructions or components having more or less functionality than illustrated and described herein.

Having described the invention in detail, it will be apparent that modifications and variations are possible without departing from the scope of the invention defined in the appended claims.

When introducing elements of the present invention or the preferred embodiments(s) thereof, the articles "a", "an", "the" and "said" are intended to mean that there are one or more of the elements. The terms "comprising", "including" and "having" are intended to be inclusive and mean that there may be additional elements other than the listed elements.

In view of the above, it will be seen that the several objects of the invention are achieved and other advantageous results attained.

As various changes could be made in the above systems and methods without departing from the scope of the invention, it is intended that all matter contained in the above description and shown in the accompanying drawings shall be interpreted as illustrative and not in a limiting sense.

What is claimed is:

1. A method of inherently securing files for distributed storage across a plurality of storage devices, wherein one or more processors execute a plurality of computer executable instructions stored on a tangible, non-transitory computer storage medium for performing the method, said method comprising:

determining whether the one or more processors can access a local storage device;

in response to determining the one or more processors cannot access the local storage device, terminating said method; and in response to determining the one or more processors can access the local storage device:

determining a number of portions in which a file will be stored based on a predetermined maximum portion length as a function of a packet size of the local storage device connected to the one or more processors and the tangible, non-transitory computer storage medium;

calculating a portion length for each of the portions based on a set of length constraints that define an interrelationship between the portions based on their respective lengths;

partitioning the file into the determined number of portions according to the calculated portion length of each portion, each partitioned portion having a content, said partitioned portions including a terminal portion;

performing one or more logical operations between the content of each partitioned portion and the content of at least one other partitioned portion, said performance of logical operations starting at a first bit of the content of each partitioned portion and proceeding bitwise to subsequent bits of the content along the length of each partitioned portion;

modifying each partitioned portion by replacing the content thereof with results of said logical operations;

assigning a unique name to each modified portion other than the terminal portion, said unique name of each modified portion indicative of the content of at least one other modified portion;

storing the terminal portion on the local storage device; and transferring all other modified portions to a remote storage through a communication network, wherein the remote storage is other than the local storage device.

2. The method of claim 1, wherein calculating a portion length comprises non-deterministically varying a portion length within a range specified by the set of constraints for each of the determined number of portions.

3. The method of claim 1, wherein said performing one or more logical operations comprises selecting the at least one other partitioned portion such that the portion length of the at least one other partitioned portion is equal to or greater than the portion length of the each partitioned portion to be modified.

4. The method of claim 1, wherein said logical operations comprises Exclusive OR performed between the content of each partitioned portion and the content of at least one other partitioned portion.

5. The method of claim 1, further comprising transforming the copied file prior to said partitioning, wherein the partitioned portions are sequentially modified, so that for a transformed file having been partitioned into first, second, and terminal portions, said first portion being not larger than a combination of the second and terminal portion, said terminal portion larger than the second portion:

the first portion is modified by replacing the content of the first portion with results of logical operations performed between the content of the first portion and the content of the second portion and the terminal portion, the second portion is modified by replacing the content of the second portion with results of logical operations performed between the content of the second portion and the content of terminal portion, and the terminal portion is modified by replacing the content of the terminal portion with results of logical operations performed between the content of the terminal portion and the content of modified first portion.

6. The method of claim 5, said assigning a unique name comprising assigning the first portion a unique name indicative of the content of the second and terminal portions, and assigning the second portion a unique name indicative of the content of the terminal portion, said unique names being masked and said mask being stored as a part of the file within the virtual file system.

7. The method of claim 5, further comprising:
copying the terminal portion into memory;
iteratively retrieving first and second portions in reverse sequential order beginning with the second portion and ending with the first portion, said iteratively retrieving further comprising reading the content of a combination of all retrieved portions to determine the next portion to retrieve;

reversing the logical operations performed on each retrieved portion;

combining all reversed portions into the transformed file; and reverse transforming the transformed file to reconstruct the copied file.

8. A method of inherently securing files for distributed storage across a plurality of storage devices, wherein one or more processors execute a plurality of computer executable instructions stored on a tangible, non-transitory computer storage medium for performing the method, said method comprising:

sequentially generating a plurality of portions of a file to be stored, wherein the plurality of portions comprise a remainder portion and one or more remote portions, said sequentially generating comprising, for each remote portion of the file to be generated:

determining a portion length for each remote portion of the file and the remainder portion of the file based on a set of length constraints that define an interrelationship between all portions of the plurality of portions based on their lengths, wherein the length constraints are independent of a graphical representation on a visual display of a target device;

dividing the file into the one or more remote portions each having content and the remainder portion having content, wherein the content of each portion of the plurality of portions comprises data from the file;

performing an Exclusive OR logical operation between a bit comprising the content of one of the remote portions and a bit comprising the content of the remainder portion;

modifying the one of the remote portions by replacing the bit comprising the content thereof with a result of the Exclusive OR logical operation;

repeating said performing and said modifying from a first end of the content of the remote portion and proceeding bitwise to each subsequent bit along the length of the content thereof;

assigning a unique name to the modified remote portion as a function of the content of the remainder portion; and storing the modified remote portion to a remote storage other than the local storage.

9. The method of claim 8, wherein determining the portion length comprises non-deterministically varying the portion length of the remote portion within a range.

10. The method of claim 8, wherein the determined portion length of each remote portion is equal to or smaller than the determined portion length of the remainder portion.

11. The method of claim 8, further comprising:
generating remote portions from the remainder portion until the remainder portion is shortened to a length equal to or smaller than a terminal length;

determining a number of additional portions into which the shortened remainder portion will be partitioned;

calculating a portion length for each of the determined additional portions;

partitioning the shortened remainder portion into the determined number of additional portions according to the calculated portion length of each additional portion, each partitioned additional portion having a content, said partitioned additional portions including a terminal portion;

modifying each partitioned additional portion by replacing the content of each partitioned additional portion with results of logical operations performed between the content of each partitioned additional portion and the content of at least one other partitioned additional portion;

assigning a unique name to each modified additional portion other than the terminal portion, said unique name of each modified additional portion indicative of the content of at least one other modified additional portion;

storing the terminal portion to the local storage; and storing all other modified additional portions to the remote storage.

12. The method of claim 8, wherein said copying comprises incrementally copying the file into a file segment until the length of the file segment is sufficient to separate a next portion.

13. The method of claim 12, wherein incrementally copying the file comprises specifying a plurality of stations of the file and further comprises randomly selecting one of the plurality of stations for said incrementally copying.

14. A system for implementing distributed file storage, said system comprising:

a client device of a user, said client device having a processor configured for:

determining a number of portions into which a file will be stored based on a predetermined maximum portion length as a function of a packet size of a local storage device connected to the clien device;

calculating a portion length for each of the determined number of portions based on a set of length constraints that define an interrelationship between all portions based on their lengths, wherein each calculated portion contains data from the file, and wherein the constraints are independent of a graphical representation on a visual display of a target device, said calculating performed concurrently with said determining based on said constraints;

partitioning the file into the determined number of portions according to the calculated portion length of each portion, each partitioned portion having a content, said partitioned portions including a terminal portion;

performing one or more logical operations between the content of each partitioned portion and the content of at least one other partitioned portion, said performance of logical operations starting at a first end of the content of each partitioned portion and proceeding bitwise to subsequent bits of the content along the length of each partitioned portion;

modifying each partitioned portion by replacing the content thereof with results of said logical operations, wherein the data necessary for formatting each modified portion is contained within the original source file, and wherein the file is capable of reassembly after reacquiring the modified partitioned portions;

assigning a unique name to each modified portion other than the terminal portion, said unique name of each modified portion indicative of the content of at least one other modified portion; and storing the terminal portion on the local storage device;

one or more storage servers; and a process server in communication with the client device and with the one or more storage servers through a communication network, said process server configured for:

receiving, through the communication network, all portions other than the terminal portion from the client device for storage; and storing the received portions to the one or more storage servers through the communication network.

15. The system of claim 14, wherein the process server is further configured for storing each of the received portions in any of the one or more storage servers without reference to other received portions, without reference to the copied file, and without reference to the user.

16. The system of claim 14, wherein the process server is further configured for storing each of the received portions independent of operations performed on the client device.

17. The system of claim 14, wherein modifying each partitioned portion comprises selecting the at least one other partitioned portion such that the portion length of the at least one other partitioned portion is greater than the portion length of the partitioned portion to be modified.

* * * * *